United States Patent
Wieland et al.

[11] Patent Number: 6,128,132
[45] Date of Patent: Oct. 3, 2000

[54] METHOD AND APPARATUS FOR GENERATING AN AUTOSTEREO IMAGE

[75] Inventors: Alexis P. Wieland, Los Angeles; Elizabeth A. Woods, LaCrescenta; Thomas F. LaDuke, Buena Park; Alfredo M. Ayala, West Covina; Andrew R. Beechum, North Hollywood, all of Calif.

[73] Assignee: Disney Enterprises, Inc., Burbank, Calif.

[21] Appl. No.: 09/351,893

[22] Filed: Jul. 13, 1999

[51] Int. Cl.$^7$ ............................................. G02B 27/22
[52] U.S. Cl. .................. 359/463; 359/462; 359/464; 359/477; 348/54; 348/56; 352/57; 352/58; 385/901
[58] Field of Search ................... 359/462, 463, 359/464, 477; 385/901; 352/57, 58, 59, 61; 348/54, 56

[56] References Cited

U.S. PATENT DOCUMENTS 5,663,831  9/1997  Mashitani ........................ 359/463
5,896,225  4/1999  Chikazawa ....................... 359/463

*Primary Examiner*—Cassandra Spyrou
*Assistant Examiner*—Leo Boutsikaris
*Attorney, Agent, or Firm*—The Hecker Law Group

[57] ABSTRACT

The invention is a method and apparatus for generating an autostereo image. The apparatus comprises at least one light source generating at least two views of an image, a parallax or "slit"-type barrier screen and at least one light-transmitting elements projecting the at least two different views provided by the light source at one or more apertures in the barrier screen. A viewer viewing the screen perceives an autostereo image as a result of the left and right eyes of the viewer seeing different views of the image. In one embodiment, the light source comprises at least one digital projector. In one embodiment, the light-transmitting elements comprise fiber optic strands. A first end of the strand is arranged to receive light projected by one of the light sources. A second end of the strand is arranged to project at a rear side of the barrier screen.

17 Claims, 6 Drawing Sheets

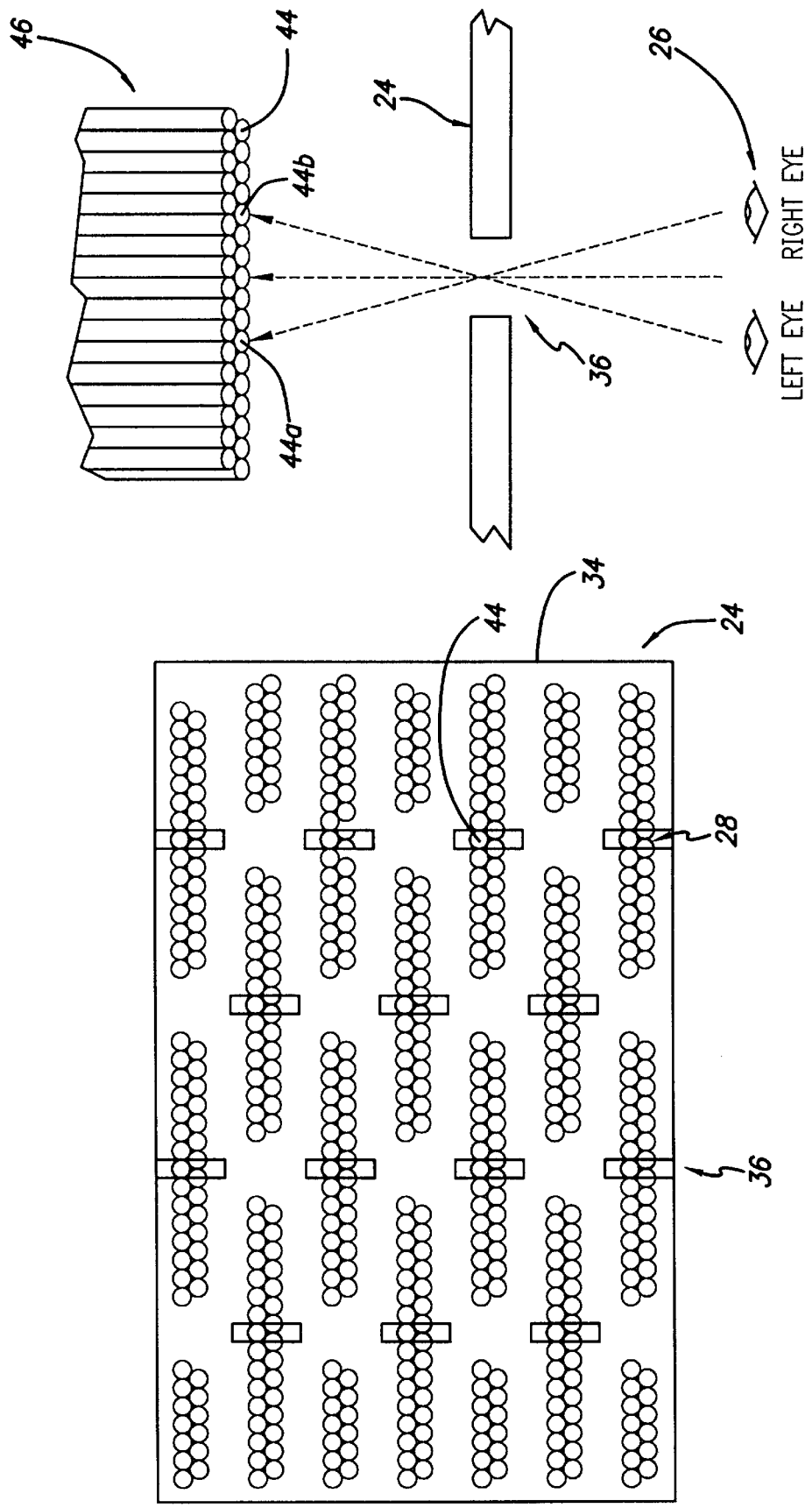

METHOD AND APPARATUS FOR GENERATING AN AUTOSTEREO IMAGE

FIELD OF THE INVENTION

The invention relates to a method and an apparatus for creating an autostereo or "3-D" image, and more particularly to a method and apparatus for generating an autostereo motion picture.

BACKGROUND OF THE INVENTION

Humans are adapted to view real objects in three dimensions (3-D). Electronically generated images, however, are generally only two dimensional (2-D). For example, the format of television and motion pictures presents images which appear only 2-D. The realism of these images would be greatly enhanced if the images could be presented so that they appear 3-D.

Many arrangements exist for presenting an image in three-dimensions. For example, a left-eye image and a right-eye image (for example, photographs of an object taken from two different perspectives) may be arranged in alternating vertical strips which are viewed through a stationary vertical parallax barrier. The parallax barrier permits the right eye of a viewer to view only the strips of the right-eye image and permits the left eye of a viewer to view only the strips of the left-eye image. Viewed separately, these left and right-eye images result in a single image which appears three-dimensional.

Alternatively, the strips of the left and right-eye images may be viewed through a stationary lenticular lens which focuses the strips of the left-eye image towards the left eye and the strips of the right-eye image towards the right eye. These arrangements are described and illustrated in U.S. Pat. No. 5,640,273.

There are several problems with the above-described parallax barrier arrangement. One problem is that a shift in the point of view of the viewer may deter viewing of the images. Another problem is that the narrowness of the slits in the parallax barrier reduces the amount of light reflected from the image strips which may pass to the viewer, reducing the brightness, and hence the visibility, of the image. The arrangement also only permits for viewing of a single static image.

Similar problems also exist when using a lenticular lens. For example, the field of viewing may be undesirably narrow and when arranged as described above, the image is static.

There have been numerous attempts at generating a series of images which appear three-dimensional. One method is to color encode images for separate presentation to the left and right eyes of a viewer. For example, color encoded left and right-eye motion picture images may be overlapped or interleaved and projected to a viewer. The viewer perceives the motion picture as 3-D when viewing the projected images through special glasses having two different colored lenses which "decode" the separate right and left-eye images.

This arrangement does not generate a true "autostereo" or automatic 3-D image in that, when viewed without the aid of the decoding glasses, the image does not appear three-dimensional. The arrangement requires all viewers to have special glasses or other equipment to perceive the image as three-dimensional. In addition, the quality of the image suffers because the true colors of the objects imaged are altered during the color encoding process and during viewing through the colorized lenses.

Other arrangements, such as that disclosed in U.S. Pat. No. 5,726,703, have similar drawbacks. In the arrangement disclosed in this patent, projected left and right-eye images are polarized at different angles. A viewer wears a pair of polarizing glasses to unite the left and right-eye images to generate a "3-D" image.

In general, these and other arrangements for generating perceived 3-D images all suffer from one or more drawbacks. Many of the arrangements are extremely complicated and/or expensive. Others do not lend themselves to viewing by more than one or a few viewers. Also, these arrangements interleave two spatially distinct images at a single point in time to generate each 3-D image, limiting the 3-D effect.

An improved method and apparatus for creating an autostereo image is desired.

SUMMARY OF THE INVENTION

The invention is a method and apparatus for generating an autostereo image. In general, the apparatus comprises at least one light source generating at least two views of an image, a parallax or "slit"-type barrier screen and at least two light-transmitting elements projecting the at least two different views provided by the at least one light source at one or more apertures or slits in the barrier screen for viewing by the left and right eyes of a viewer.

In one embodiment, the light source comprises at least one digital projector. A signal generator may be utilized to control the digital projector(s). In one or more embodiments, the signal generator controls the digital projector(s) to generate a succession of images to create an autostereo motion picture.

In one or more embodiments, the light-transmitting elements comprise fiber optic strands. A first end of the strand is arranged to receive light projected by one of the light sources. A second end of the strand is arranged to project at a rear side of the barrier screen.

In one or more embodiments, at least two fiber optic strands are arranged to project two differing views of an image at one or more apertures in the barrier screen. When viewed by the left and right eyes of a viewer facing a front side of the barrier screen, the differing views projected by the fiber optic strands generated an autostereo image.

Further objects, features, and advantages of the present invention over the prior art will become apparent from the detailed description of the drawings which follows, when considered with the attached figures.

BRIEF DESCRIPTION OF THE DRAWINGS

FIG. 2(a) is a front view of an embodiment of a screen portion of an apparatus such as that illustrated in FIG. 1;

FIG. 3 is a top view of a portion of the apparatus illustrated in FIG. 1;

DETAILED DESCRIPTION OF THE PREFERRED EMBODIMENT

In the following description, numerous specific details are set forth in order to provide a more thorough description of the present invention. It will be apparent, however, to one skilled in the art, that the present invention may be practiced without these specific details. In some instances, well-known features may have not been described in detail so as not to obscure the invention.

Figure 1:
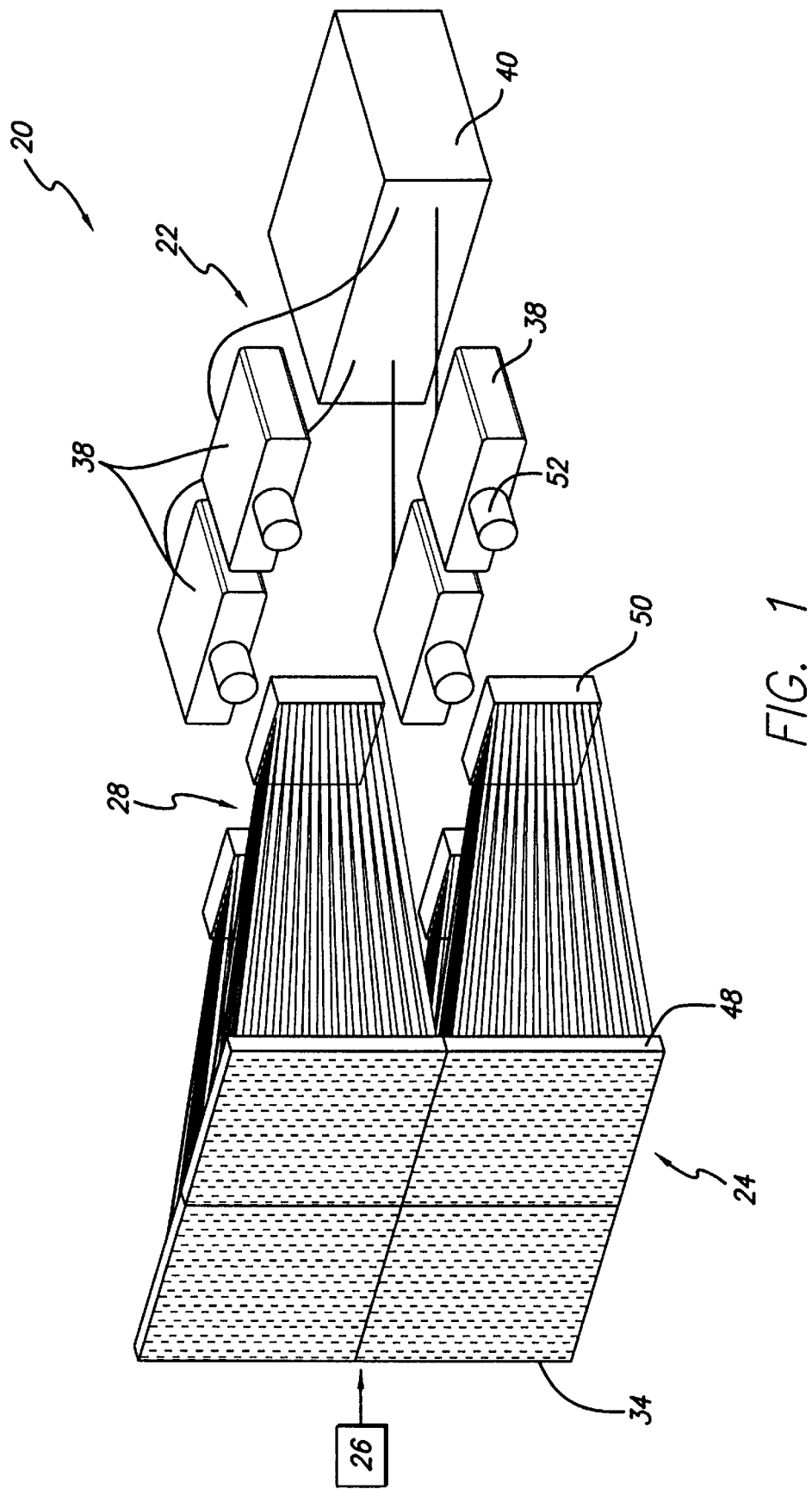
FIG. 1 illustrates an apparatus for creating an autostereo image in accordance with one embodiment of the invention.

The invention is an apparatus and method for generating an autostereo image. Referring to FIG. 1, the apparatus 20 generally comprises at least one light source 22 for generating light representing at least two image views, light-transmitting elements 28 for transmitting light from the at least one light source 22 and projecting the light at a barrier screen 24. Light projected by the transmitting elements 28 selectively passes through the barrier screen 24 for viewing by the left and right eyes of one or more viewers 26 (see also FIG. 3). The apparatus 20 generates an autostereo image when the left and right eyes of a viewer 26 perceive the two image views.

Barrier Screen

In general, the barrier screen 24 is a parallax or "slit"-type barrier screen. In one embodiment, illustrated in FIGS. 1 and 2, the barrier screen 24 may comprise an acetate film screen 34. In such an arrangement, the film screen 34 comprises a photo-lithograph having a black or other substantially opaque background.

A number of narrow, substantially transparent vertical slits or apertures 36 are provided in the screen 34. The film screen 34 has a front side which faces the viewers 26, and a rear side at or onto which the light-transmitting elements 28 project light. It is desirable for the barrier screen 24 to have a relatively small thickness from its front to its rear sides.

The opaque background of the film screen 34 generally prevents light projected from the light-transmitting elements 28 from passing from the rear side to the front side of the screen 34. Light projected onto the screen 34 by the light-transmitting elements 28 does pass, however, through the transparent apertures 36.

Each aperture 36 is relatively narrow. The exact size of each aperture 36 may vary, but in general each aperture 36 is narrow in relation to the width of the opaque region surrounding it. As described in more detail below, in one or more embodiments, the apertures 36 have a width of approximately 1.5 times a size of a light transmitting element 28 associated therewith. The apertures 36 are generally closely spaced.

In one or more embodiments, as illustrated in FIG. 2(a), the apertures 36 are provided in an alternating grid pattern. As illustrated, the apertures 36 are provided in spaced fashion in vertical columns. The apertures 36 of adjacent columns are staggered or offset from one another (i.e. do not align along horizontal axes).

Figure 2B:
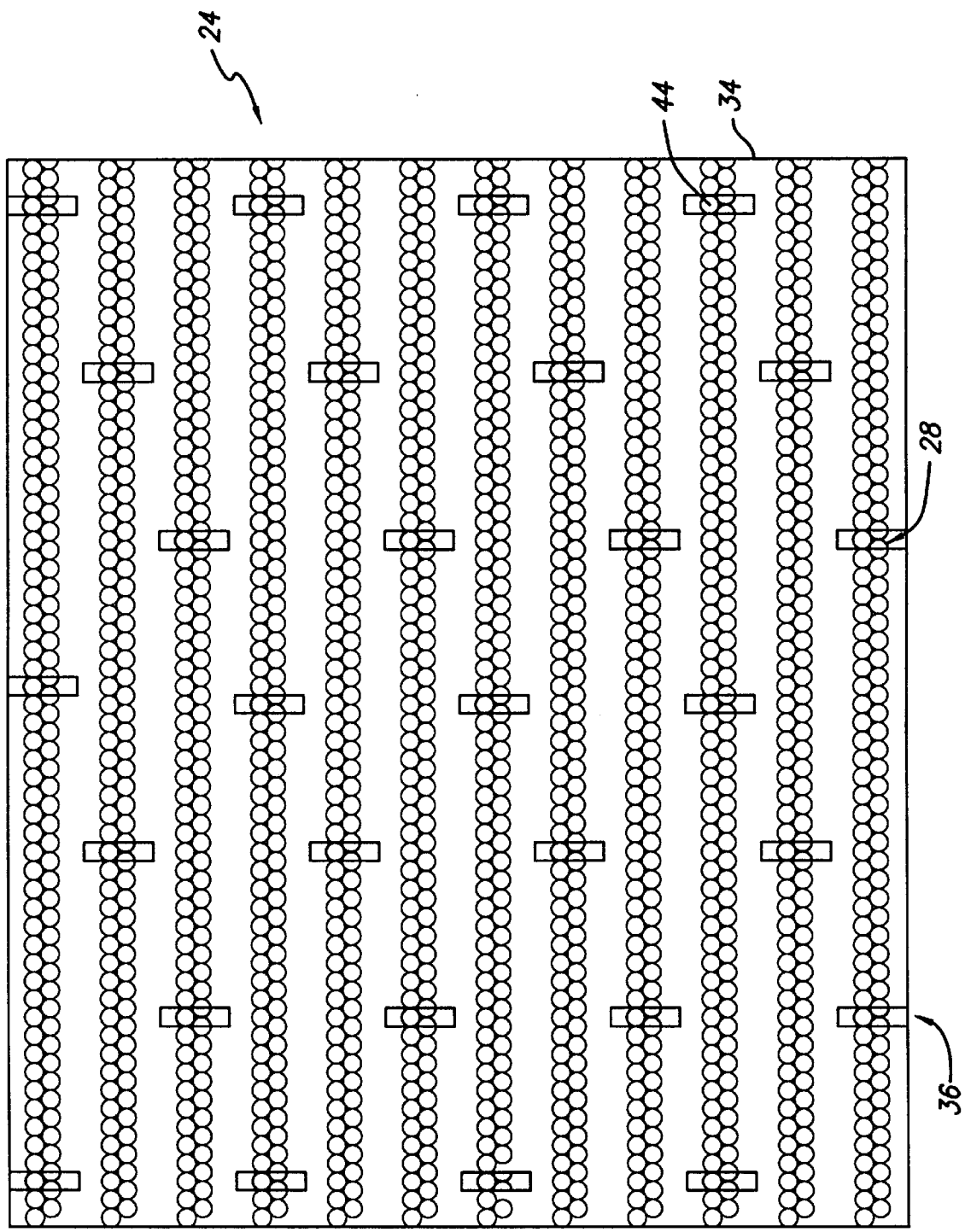
FIG. 2(b) is a front view of another embodiment of a screen portion of an apparatus such as that illustrated in FIG. 1.

In one or more embodiments, as illustrated in FIG. 2(b), the apertures 36 are provided in a three-way "weave" pattern. In this arrangement, the apertures 36 align vertically in only every third row. This arrangement has the advantage of reducing the perceived pattern of stripes or dots on the viewed screen 34.

In an arrangement such as illustrated in FIG. 2(b), the vertical spacing between each row of apertures may be about 1.06 mm and the horizontal spacing between apertures on a given row about 6.35 mm. Such an arrangement gives an apparent horizontal aperture spacing of about 2.12 mm.

The apertures 36 may be arranged in a wide variety of configurations other than those described above. In general, it is desireable for the apertures 36 to repeat or align in prime numbers of rows (ex. 3 in FIG. 2(b)) and for the pattern to be non-visually repetitive as such reduces the perceived pattern of dots or stripes.

Those of skill in the art will appreciate that the barrier screen 24 may be arranged in a wide variety of manners to provide the above-stated effects. For example, the film screen 34 may comprise a substantially transparent film having a reflective rear surface in all but the areas of spaced narrow vertical apertures. The barrier screen 24 may also be constructed of a relatively rigid, opaque material such as black plastic or metal sheet having either openings therethrough forming the apertures 36 or translucent areas therein forming the apertures. The barrier screen 24 may comprise an glass sheet having a thin layer of metal deposited thereon, the apertures 36 comprising areas in which no metal is deposited on the glass. This particular arrangement of the barrier screen 24 is simple to construct and yet has substantial rigidity. Such prevents the screen 24 from moving and precisely fixes the positions of the apertures 36.

The barrier screen 24 also need not be flat. For example, the barrier screen 24 may be convex or concave, "s"-shaped, circular or the like. The barrier screen 24 need not be a single element. For example, the barrier screen 24 may be formed in modular fashion from a number of interconnected smaller barrier screen elements.

The barrier screen 24 may be formed to be free standing or require one or more support elements. As described below, the barrier screen 24 may be formed directly on another element.

The exact size of the barrier screen 24, such as its width and height, may vary dependent upon the specific application of the apparatus 20. For example, in theater viewing the barrier screen 24 may be much larger than in a home application.

Light Source

The invention includes a means for generating a visible image, such as one or more light sources. In one or more embodiments, the light source 22 comprises a light emitting or generating device. In the embodiment illustrated in FIG. 1, the light source comprises one or more digital projectors 38.

The digital projectors 38 may be of a variety of types, such as PLUS UP-800 Digital Projectors using Texas Instruments Digital Light Processing technology. The projectors 38 are arranged to project multiple individual images (which may comprise a portion of a larger image) in pixel-like fashion from mirrors positioned on SDRAM.

In one or more embodiments, a signal generator 40 is provided for controlling one or all of the digital projectors 38. The signal generator 40 is arranged to control the timing of the projection of images, as well as the image data which defines what the projectors 38 project.

In one or more embodiments, the signal generator 40 includes or is associated with an information or data storage device (not shown). This device may store the data for generating the image(s) to be displayed by the apparatus 20, such as digital image information. The signal generator 40 may comprise a computer or other device including a processor device.

In this regard, it is noted that the appropriate image or view information must be provided to the apparatus 20 in order for the apparatus to generate the 3-D image(s). This may be accomplished in a number of manners. For example, images (such as a sequence of images forming a movie) are generated or shot from different angles or positions. Where digital projectors 38 are used, this view information is generated in digital form or converted to digital form.

As described in more detail below, light from the light source(s) 22 is projected to the light-transmitting elements 28, which in turn transmit and project the light onto the barrier screen 24. In order for the viewer 26 to perceive an image as 3-D, the eyes of the viewer must see different views of the image or object. In the case of the present invention, this requires that the light source(s) 22 provide two or more differing views of the image(s) to be projected.

In the arrangement described above, multiple views of the image(s) are projected by the digital projectors 38. In this regard, the signal generator(s) 40 are arranged to control the digital projectors 38 to project individual images which vary in the "X" direction (i.e. horizontal) and/or "Y" direction (i.e. vertical) and/or angle of orientation at the light-transmitting devices. These various image views are then transmitted by the light-transmitting devices 28 and projected at the barrier screen 24. As described in more detail below, when these multiple views of an image are viewed, they present a coherent single image which appears autostereo.

In one or more embodiments, the apparatus 20 is arranged to generate an autostereo motion picture. An autostereo motion picture may be generated by causing the projectors 38 to project a series of images in succession. As is well known, when the images are projected at a sufficiently high rate, the motion picture is presented in seamless fashion to the viewer 26.

The projection of a motion picture is facilitated by control of the projectors 38 by the signal generator 40, which controls the projection of images by the projectors 38, including the timing and rate of image projection.

The light source(s) 22 may be of a wide variety of devices or elements other than the digital projectors 38 described above. For example, when the light generators are arranged to project images which correspond to digital image data, the light source(s) 22 may comprise one or more light emitting diodes, one or more liquid crystal displays or the like. The light source(s) 22 may also include standard cellulose-type illumination projectors, as described below.

Light-Transmitting Elements

One or more light-transmitting elements 28 transmit the light representing the image views generated by the light source 22 (such as projectors 38 described above) and project the light at the barrier screen 24.

In one or more embodiments, the light-transmitting elements 28 comprise fiber-optic strands 44. Each strand 44 has a first end and a second end. The first end of each strand 44 is arranged to receive light, such as light projected from one of the digital projectors 38. The second end of each strand 44 is arranged to project light towards the barrier screen 24, as described in more detail below.

As is well known in the art, fiber optic material is arranged to efficiently transmit light energy. The fiber optic strands 44 may be of a variety of types and sizes. For example, the optic fiber may comprise plastic PMMA, large core polymer or glass. As illustrated, the strands 44 comprise relatively flexible material having a substantially circular cross-section. The strands 44 may be shielded or unshielded.

In one or more embodiments, at least two light-transmitting elements are arranged to project light through each aperture 36 of the barrier screen 24. In other words, a viewer 26 will see at least two different sources of light through one or more of the apertures 36. Thus, in accordance with one or more embodiments of the invention, at least two fiber optic strands 44 are arranged to project light at each aperture 36 of the barrier screen.

In the embodiment illustrated in FIG. 3, multiple strands 44 are arranged to project at each aperture 36 of the barrier screen 24. As illustrated, a ribbon 46 of strands 44 is arranged to project light at each aperture 36. In the embodiment illustrated, each ribbon 46 comprises two horizontally extending rows of multiple strands 44. In one or more embodiments, each aperture 36 is illuminated by fifty (50) strands 44: two (2) vertically stacked horizontal rows of twenty-five (25) strands.

In one or more embodiments, means are provided for aligning the strands 44 with respective apertures 36. As illustrated, the means for aligning comprise one or more terminal blocks 48. Each terminal block 48 is fixed to, or fixed with respect to, the barrier screen 24. The second end of each fiber optic strand 44 is connected to a terminal block 48, and thus arranged to project light in a specific location at the barrier screen 24.

The terminal blocks 48 may comprise a wide-variety of elements. For example, a terminal block 48 may comprise molded plastic elements having one or more apertures therein into which the second ends of the strands 44 are inserted. The barrier screen 24 may be mounted to the front side(s) of the terminal block(s) 48.

As stated above, the first end of each fiber optic strand 44 is arranged to receive light from a light source. As illustrated in FIG. 1, the first end of each strand 44 is arranged to receive light generated by one of the digital projectors 38.

In one or more embodiments, the first ends of the strands 44 are mounted to one or more launch grids 50. The launch grids 50 position the strands 44 relative to the light source(s) 22, such as the digital projectors 38. The launch grids 50 may be similar to the terminal blocks 48 described above.

The fiber optic strands 44 may be continuous or discontinuous. For example, a first strand portion may lead from a launch grid 50 and a mating second strand portion may lead from a terminal block 48, the two portions selectively engageable, such as through an appropriate connector or link.

Operation Effect and Other Features

The operation of the apparatus 20 will now be described. The digital projectors 38 or other light source(s) are arranged to project light. In the embodiment described above, the signal generator 40 instructs each digital projector 38 when and what to project.

The light which is projected by each projector 38 is transmitted by the ribbons 46 of fiber optic strands 44. This light is projected at the rear side of the barrier screen 24. As illustrated in FIG. 3, when a user views the front side of the barrier screen 24, light projected by some, but not all, of the fiber optic strands 44 passes through the apertures 36 into view by the viewer.

Each eye of the viewer 26 sees or receives light from different fiber optic strands 44. Because the light projected from each of these strands 44 represents a different view of an image (or portion thereof), the viewer's eyes see two different images. These two image generate an autostereo or "3-D" image. An adjacent viewer will see two views distinct from the first viewer, creating a 3D image similar to that of the first viewer's, but from a slightly different angle. Also, if a viewer moves his head from side to side he will see distinct three-dimensional views of the image—known as the "look around" effect. The presentation of multiple angular views, creating a separate 3D effect from that which is possible with only two views, comprises a significant advantage and effect over the prior art.

In order for the viewer 26 to perceive the image as autostereo, it is necessary for the viewer 26 to see two different views of the image or object. As described above, in one or more embodiments, light representing differing views of the image are projected by the projectors 28 at the strands 44, and the strands 44 transmit and project these views to the viewer 26. The number of views which are projected at a viewer 26 may be equal to the number of strands 44 associated with each aperture 36. In the embodiment described above where there are two (2) rows of twenty-five (25) strands 44 associated with each aperture 36, a total of fifty (50) views may be projected at a viewer.

In order for the views of the image which are displayed by the many strands 44 to generate a coherent image, the individual view data presented by the many strands 44 must be presented to the viewer 26 in a specific pattern. In the embodiment described above and illustrated, the orientation of the strands 44 at the launch grids 50 is the same as at the terminal blocks 48. Thus, projecting a coherent image at the first end of the strands 44 would simply result in the projection of the same image at their second ends. In order for a viewer to see a 3-D image, however, the projected views must be "scrambled" so that the view data projected by the strands 44 cooperate to project coherent views forming a single autostereo image. This aspect of the invention is illustrated in FIG. 3. If a coherent image is projected onto adjacent strands 44a and 44b by the light source 22, then the left and right eyes simply see different portions of the same view. In order to generate an autostereo image, the adjacent strands 44a, 44b must be arranged to project differing views of the same image to the viewer.

In the embodiment described above, the signal generator 40 instructs the digital projectors 38 to display the differing views in the X, Y and/or angular directions at the various strands 44. In other words, the views are generated by the light source 22 in a "scrambled" fashion, such that when displayed by the grid of ribbons of strands 44, the displayed image is coherent. This process is simplified by using a signal generator 40 and digital projectors 38 as described above, since the projectors 38 can be instructed to display individual pixel information at the various strands 44 and thus the image information can be generated by the light source 22 in a scrambled fashion. For example, in the arrangement illustrated in FIG. 3, a projector 38 may be arranged to project a portion (such as a pixel) of a first view of an image/object at the first end of the strand 44a, and portion of a second view of the image/object at the first end of the strand 44b, even though the first ends of the strands 44a, 44b are located near one another and associated with a single projector.

In one or more embodiments, the "mapping" of the arrangement/configuration by which the apparatus 20 must be arranged to present the view data may be performed by using a computer to drive the projectors 38 with known signals and using a digital camera placed at various locations to receive the projected data. A feedback loop may be used to manipulate the signal pattern until the projectors 38 project images in a pattern that results in the generation of the desired autostereo images. This "mapping" information may be used by the source generator 38 or other projector control to cause the projectors 38 to project other view information in a manner which results in the creation of autostereo images. Because the image generation may be computer controlled, calibration of the apparatus 20 is automatic. This makes the set up and operation of the apparatus 20 simple, and renders storage of the information which is to be used to generate the images independent of the arrangement of the screen 24.

Various other features may be associated with the apparatus 20 when it is computer controlled. For example, an interactive environment may be generated by providing viewers 26 with keypads for inputting information, such as a desired next image or sequence of images (such as in an arrangement where viewers are permitted to select an ending to a movie from multiple endings).

Of course, it is possible to project coherent views of an image onto the first ends of the strands 44 and then route or weave the individual strands 44 between the launch grids 50 and terminal blocks 48 so that the strands 44 project the view data onto the appropriate portion of the barrier screen 24 in a manner whereby the resultant images appear autostereo. This method is significantly more complex in terms of the physical arrangement of the apparatus 20, however.

Such an arrangement might be necessary in the instance where the views or individual components of views are generated by the light source 22 can not be associated with each strand 44 in the manner described above. For example, if a light source 22 can only provide a coherent view (such as with a standard cellulose-type illumination projector), a first view must be projected at one set of strands 44 and a second view projected at another set of strands 44, and then the strands routed so that they project the components of the views to the left and right eyes of the viewers in the manner described above and illustrated in FIG. 3.

While as few as two views may be provided to generate the autostereo image, as described above, in one or more embodiments multiple fiber optic strands 44 present multiple views of an image. In the embodiment where the strands 44 are provided in ribbons 46, more strands 44, and thus more views can be incorporated into a given geometric space. As described above, where fifty (50) strands 44 are associated with each aperture 36, fifty views may be presented.

In general, the arrangement where multiple strands 44 project light enhances the autostereo effect and permits more light to be emitted through each aperture 36. This has the effect of providing for a very visible, generally uniform light-intensity level image to be presented over the entirety of the screen 24 to all viewers 26. Because of the high light level, the apertures 36 may be very narrow, generating autostereo images which are sharper and result in better depth perception.

While it is desirable to minimize the size of the apertures 36 to increase the sharpness of the images, it is also desirable to provide the apertures 36 of sufficient size to provide a high light level output. In one or more embodiments, it has been found advantageous to provide each aperture 36 in a width equal to approximately 1.5 times the diameter of the projecting fiber strand(s) 44.

It is desirable to arrange the strands 44 of the bundles or ribbons 46 into a "hex-pack" type row arrangement, since such permits better registration of the ribbons 46 of strands 44 at the launch grid 50 and terminal blocks 48. Because the strands 44 are round, they are not well-suited to alignment and stacking in direct alignment. This packing arrangement provides for a high number of strands 44 in a geometric area, increasing the coupling efficiency by reducing the interstitial spacing between the strands 44. This arrangement also reduces the perception of a "pixel" pattern associated with the projecting ends of the strands 44.

In one or more embodiments, an anamorphic lens 52 (see FIG. 1) may be associated with the light source 22. In particular, where digital projectors 38 are arranged to project at rows of fiber optic strands 44, an anamorphic lens 52 or lenses may be used to increase the angle of projection, as is well known in the art. In this manner, the projectors 38 may be arranged to project image information at a number of strands 44 which is larger than if the lens were not used.

Another aspect of the use of such a lens 52 arises from the arrangement of the strands 44. As described above, the strands 44 are hex-packed, such that the density of the strands 44 in the horizontal direction is 1.866 times as dense as the strands 44 in the vertical direction. Use of an anamorphic lens 52 having a lens ratio of 1:1.866 compensates for the density differential and permits the information to be projected onto the ends of the strands 44 in the same "density" as the strands 44 are packed.

As illustrated in FIGS. 2(a) and 2(b), the staggered arrangement of the apertures 36 in the barrier screen 24 facilitates use of the wide ribbons 46 of strands 44. The arrangement illustrated in FIG. 2(b) provides greater spacing than that of the arrangement in FIG. 2(a) since the apertures 36 are "triple-staggered" in the horizontal direction (and do not align vertically except in at least every third horizontal row).

Figure 4C:
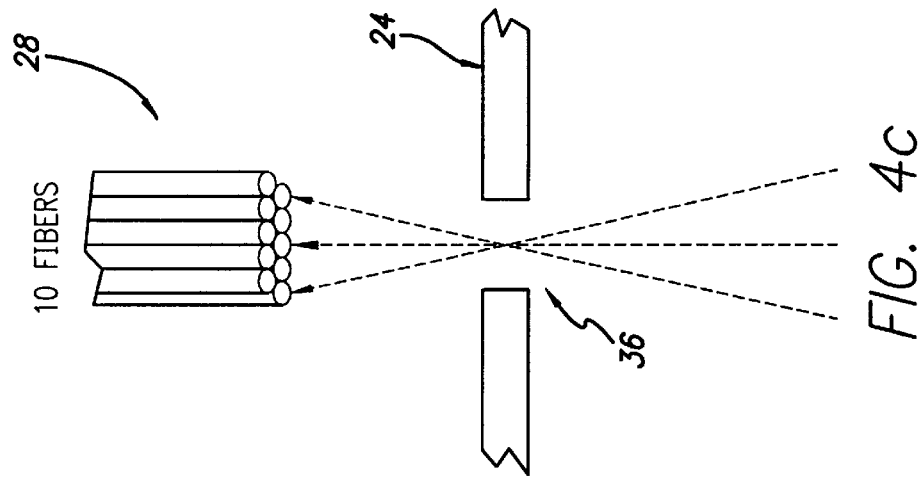
FIGS. 4(a)–(c) illustrate arrangements of light transmitting elements arranged to project at a barrier screen of an apparatus such as that illustrated in FIG. 1.
Figure 4B:
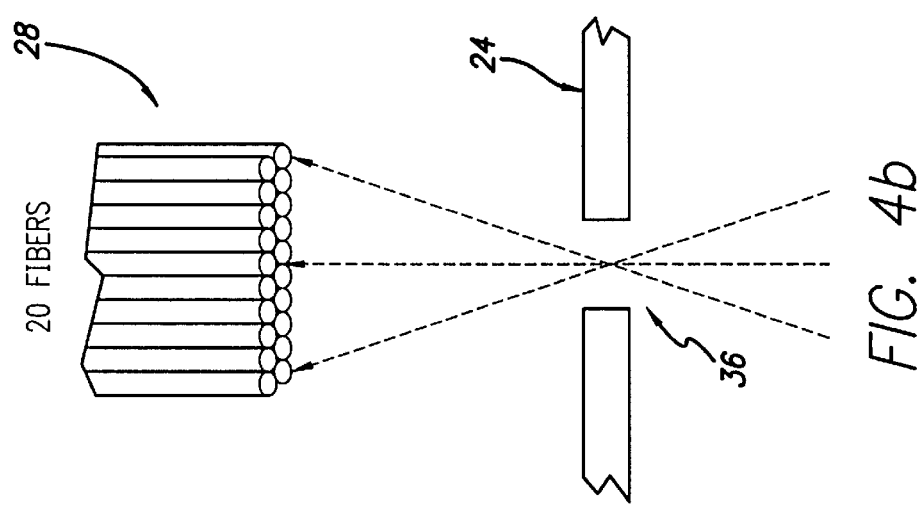
Figure 4A:
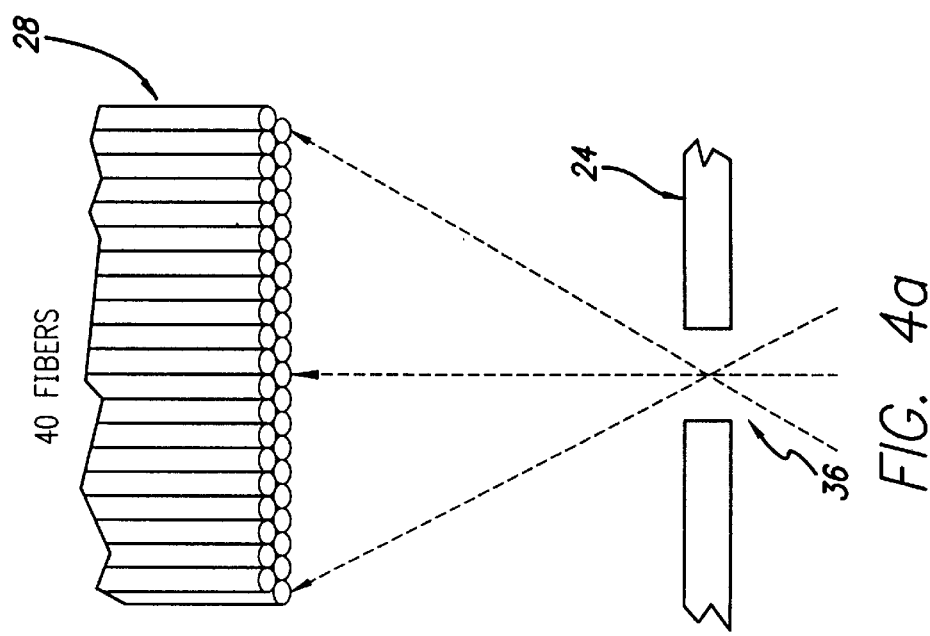

As may be appreciated, the distance from the second or projecting end of each strand 44 to the barrier screen 24 has an impact on the focal distance, and thus the viewing angle of the apparatus 20. As illustrated in FIGS. 4(a)–(c), the number of strands 40 which must be provided when the projecting ends of the strands 44 are far from the screen 24 must be increased to preserve the same viewing angle. Conversely, by retaining the same number of strands but moving the strands closer to the barrier screen the viewing angle is increased. In this way different parts of the screen can have different sized viewing cones.

Of course, the fewer strands 44 which are associated with a particular aperture 36, the fewer number of views which may be presented, reducing to some degree the autostereo effect. Humans most effectively perceive depth near the center of the field of view, thus an apparatus 20 may be constructed where the amount of stereo information provided is great near the center of the screen 24 (by providing a large number of viewable strands 44 for each aperture 36, as illustrated in FIG. 4(a)) and less near the horizontal and vertical edges (by providing only a few number of viewable strands 44 for each aperture 36, as illustrated in FIG. 4(c)). Such an arrangement would reduce the total number of strands 44 and associated with the apparatus 20. This may result in substantial savings in the resources associated with providing the apparatus 20.

In the embodiments described above, the multiple views of an image/object are projected to a viewer 20 through each aperture 36 for viewing by the left and right eyes of one or more viewers 26, whereby an autostereo image is created. In addition, the apparatus 20 is arranged to project multiple images in seamless succession, whereby an autostereo motion picture is generated.

In the arrangement of the invention, autostereo or 3-D images are generated by the apparatus 20 without the need for glasses or other viewing aids by the viewer.

The apparatus of the invention generates images which appear differently to each eye of a viewer (an interocular effect). In addition, images of objects or their position appears to move (a parallax or "look-around" effect), such as when the viewer moves slightly with respect to the screen 24. In this manner a highly distinct 3-D effect is perceived.

The apparatus 20 as described has a significant advantage in that the generated 3-D image is viewable over a wide angle. This aspect of the invention may be appreciated when considering FIGS. 2(a) and 2(b). As illustrated, the viewers 26 over a wide range of positions have the one or more projecting strands 44 necessary to generate an autostereo image visible to them.

Figure 5A:
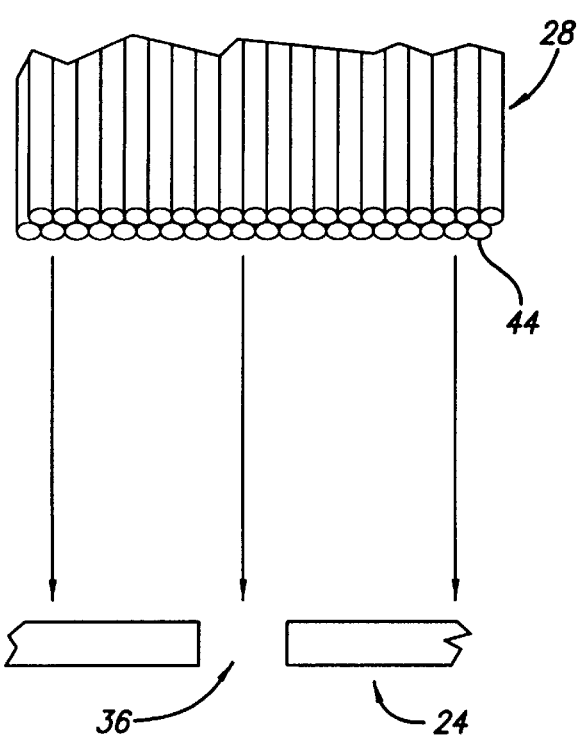
FIGS. 5(a)–(d) illustrate arrangements for projecting light from light transmitting elements at a screen portion of an apparatus such as that illustrated in FIG. 1.
Figure 5B:
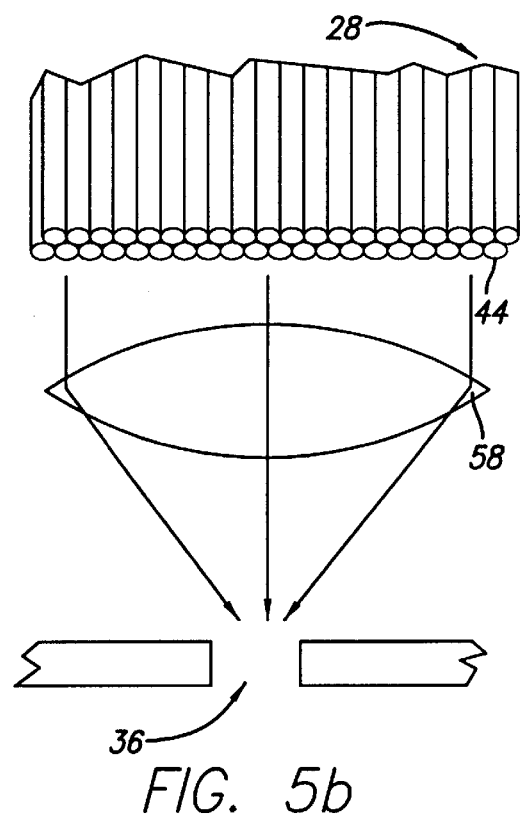

It is noted with respect to FIG. 5(a) that the strands 44 tend to project at a rather narrow angle or cone, such that the amount of light visible to a viewer viewing a particular aperture 36 at an acute angle (i.e. instead of the viewer's line of sight projecting perpendicular to the screen 34, the viewer's line of sight moves towards parallel to the screen 34) drops off. As such, one or more arrangements may be employed to increase the amount of light projected to viewer's viewing the screen 24 at acute angles. In one arrangement, the strands 44 near the ends of each bundle associated with an aperture 36 may be angled inwardly. This arrangement, however, is physically demanding, requiring complex placement and retention of each strand 44 in a particular position. An alternative, as illustrated in FIG. 5(b), is to place one or more lenses 58 between the projecting ends of the strands 44 and the screen 34 to focus the light projected by the strands through the aperture 36.

Figure 5C:
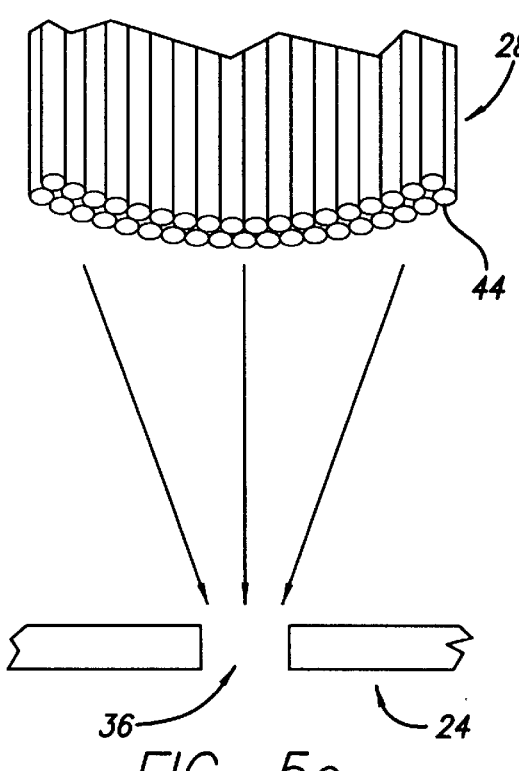

Another arrangement, as illustrated in FIG. 5(c) is to cut the ends of one or more of the strands 44 at an angle by which the end of the strand acts as a lens directing the light emitted therefrom.

Figure 5D:
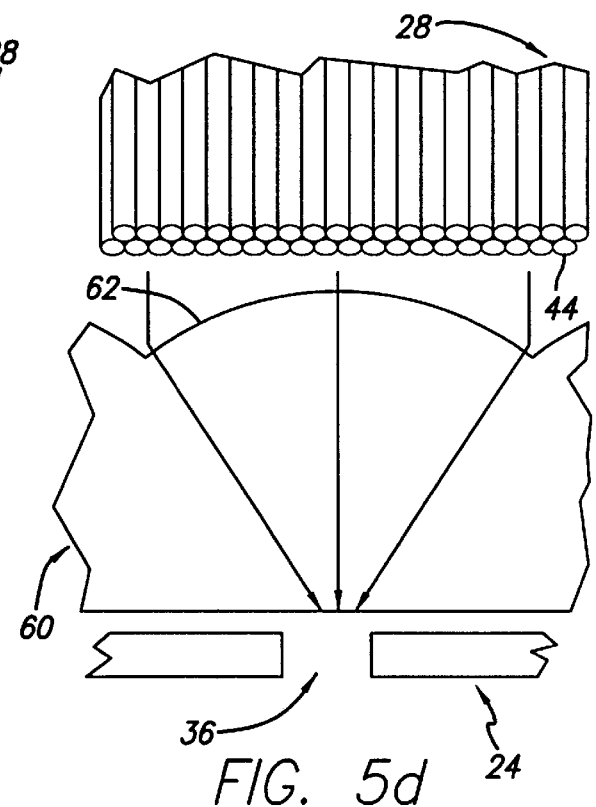
Figure 6:
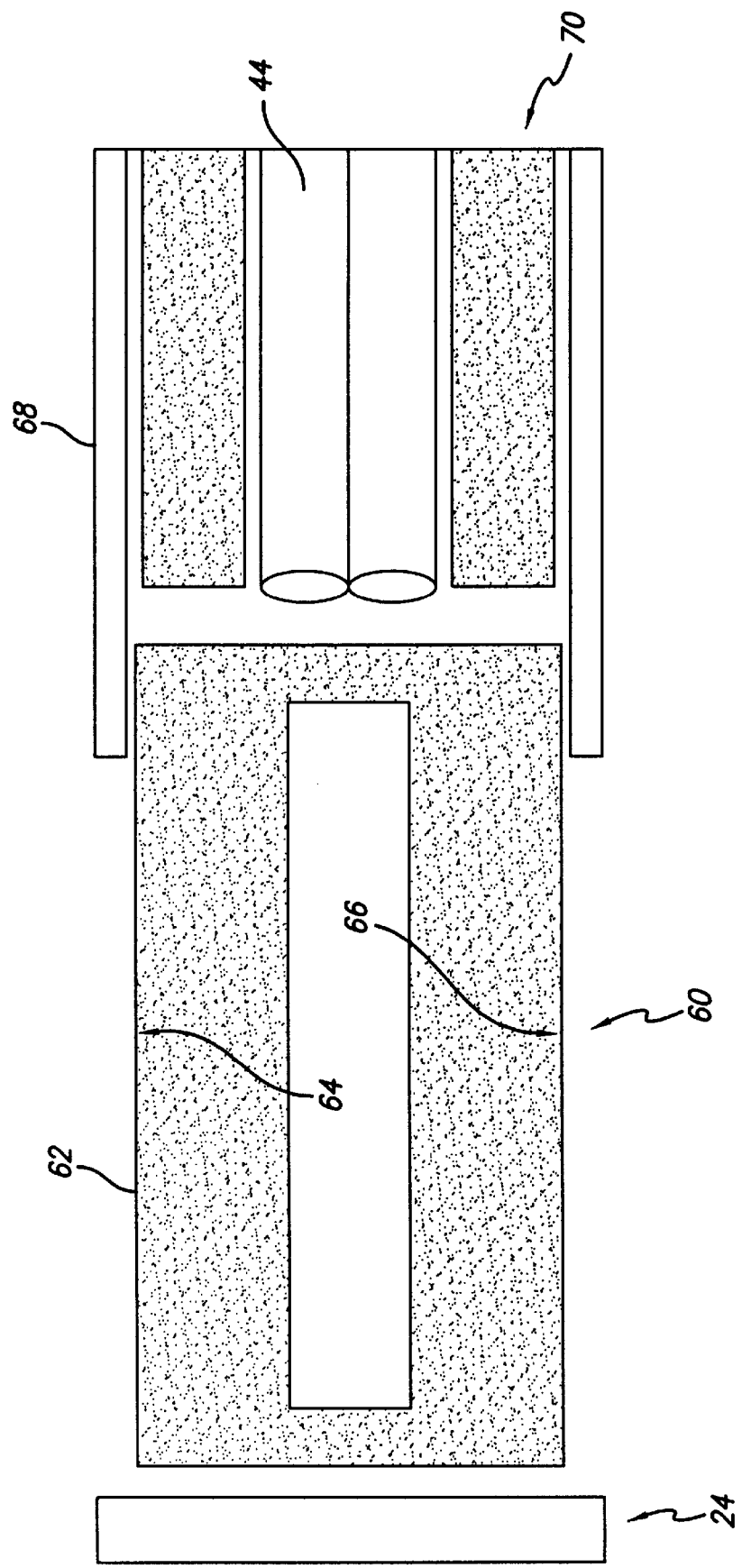
FIG. 6 illustrates an arrangement of a barrier-lens element for focusing and baffling light projected from light transmitting elements.

Yet another arrangement, as illustrated in FIG. 5(d) is to place one or more barrier-lens elements 60 between the projecting ends of the strands 44 and the screen 34. As illustrated, each element 60 comprises a lenticular or similar lens 62 which serves to focus the emitted light from the multiple strands 44 at the aperture 36. Further, referring to FIG. 6, in one or more arrangements, the top and bottom surfaces 64,66 of the barrier-lens element 60 are arranged to prevent light from straying in or out, to or from another set of strands 44. In one arrangement, the top and bottom surfaces of the barrier-lens element 60 are either reflective or absorptive, serving to baffle the light between adjacent rows of strands 44.

Use of barrier-lens elements 60 with the rows of strands 44 has the added advantage of serving as a solid interconnection between the screen 34 and strands 44. As illustrated, each set of two rows of strands 44 may be located within a cover 68 by one or more spacers 70. The cover 68 may then be directly connected to the barrier-lens element 60. The barrier-lens element 68 may comprise or form a portion of the above-described terminal block(s) 48. Such an arrangement serves to secure the elements of the apparatus 20 and improve its durability.

Other advantages of the apparatus 20 are that it projects images which are highly distinct and closely spaced due to the number of strands 44 projecting images and the narrowness and number of apertures 36. Images are projected without dead zones or cross-over zones which might affect viewing in one or more locations.

The apparatus of the invention can be used to project image(s) in 2-D. In this arrangement, the image(s) are, like projected 3-D images, high resolution and bright. When projecting a 2-D image, the digital projector(s) or other light source(s) are simply arranged to project a single view or image instead of the multiple views of the same image.

The arrangement of the apparatus 20 also permits different images to be presented to viewers in different locations. For example, one image may be presented to viewers 26 viewing a center portion of the screen 24, and another image presented to those viewers viewing end portions of the screen.

An advantage of the invention is that the apparatus can be modular. For example, as illustrated in FIG. 1, the screen 24 may be formed from a number of "modules" each comprising a terminal blocks 48 each having a front side associated with a barrier screen portion and a number of strands 44 leading from a rear side to a launch grid 50. In this arrangement, the apparatus 20 is formed by assembling a number of the terminal block 48 and associating the launch grids 50 with individual digital projectors 38.

A modular construction permits the apparatus 20 to be sized to a particular need simply by adding or removing "modules" and associating or disassociating them with a digital projector 38. In addition, each module comprises an assembly of relatively standard elements. These factors may contribute to a reduced system cost and a simplified repair arrangement.

Of course, the foregoing description is that of one or more embodiments of the invention, and various changes and modifications may be made without departing from the spirit and scope of the invention, as defined by the claims.

What is claimed is:

1. An apparatus for generating an autostereo image comprising:
    a barrier screen, said screen having a first side and a second side and defining one or more apertures through which light may pass from said first to said second side;
    at least one light source for generating at least a first and a second image; and
    at least one fiber optic strand arranged to transmit light from said light source and project it onto a first side of said barrier screen, whereby said at least a first and a second image projected towards said first side of said screen selectively pass through said one or more apertures, generating an autostereo image when viewed from said second side of said screen.

2. The apparatus in accordance with claim 1 wherein said light source comprises at least one digital projector.

3. The apparatus in accordance with claim 1 wherein said light source comprises at least two digital projectors and including at least one signal generator for controlling the output of said digital projectors.

4. The apparatus in accordance with claim 1 wherein multiple strands are arranged into a ribbon, each ribbon of strands arranged to project at said barrier screen.

5. The apparatus in accordance with claim 4 wherein said ribbon is arranged to project at a single aperture of said barrier screen and has a width greater than a width of the aperture through which it is arranged to project.

6. The apparatus in accordance with claim 1 wherein said barrier screen comprises a film having one or more generally translucent apertures separated by a generally opaque background.

7. The apparatus in accordance with claim 6 wherein said apertures are arranged in horizontal rows, each horizontal row comprising at least two apertures, apertures in adjacent rows in the vertical direction offset in a horizontal direction.

8. The apparatus in accordance with claim 7 wherein apertures in said horizontal rows only align in the vertical direction every third horizontal row.

9. The apparatus in accordance with claim 1 wherein at least one first fiber optic strand is arranged to project light comprising a first image and wherein at least one second fiber optic strand is arranged to project light comprising a second image.

10. The apparatus in accordance with claim 1 wherein said fiber optic strands have a second end arranged to project at said screen and including one or more mounting elements for positioning said second end of each of said fibers with respect to said barrier screen.

11. The apparatus in accordance with claim 1 wherein said fiber optic strands have a first end arranged to receive light from said at least one light source and including one or more mounting elements for positioning said first end with respect to said at least one light source.

12. A method for generating an autostereo image comprising:
    projecting at least a first view and a second view of at least one image onto a first end of at least two fiber optic strands;
    transmitting said at least a first and a second view from said at least one light source with said at least two fiber optic strands; and
    projecting said at least a first and a second view transmitted by said at least two fiber optic strands through at least one aperture in a barrier screen.

13. The method in accordance with claim 12 wherein said at least one light source comprises at least one digital projector and further including the step of controlling said at least one digital projector with a signal generator.

14. The method in accordance with claim 13 wherein said step of controlling comprises causing said at least one digital projector to project scrambled image information.

15. A system for generating an autostereo image comprising:
    a barrier screen defining at least one aperture through which light may pass;
    at least one light source;
    a control arranged to control said at least one light source to project light representing at least a first view and a second view; and
    at least one first light-transmitting element arranged to transmit said light representing said first view and project said light representing a first view towards said at least one aperture and at least one second light-transmitting element arranged to transmit said light representing said second view and project said light representing a second view towards said at least one aperture.

16. The system in accordance with claim 15 wherein said at least one light source comprises at least one digital projector.

17. The system in accordance with claim 15 wherein said at least one first and second light-transmitting elements comprise fiber optic strands.

* * * * *